C. E. HAY & H. W. SULLIVAN.
ELECTRICAL RESISTANCE.
APPLICATION FILED SEPT. 1, 1914.
1,155,058.
Patented Sept. 28, 1915.
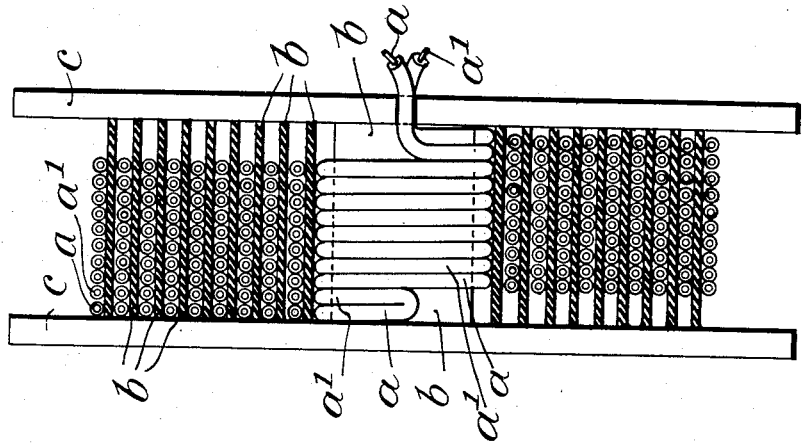
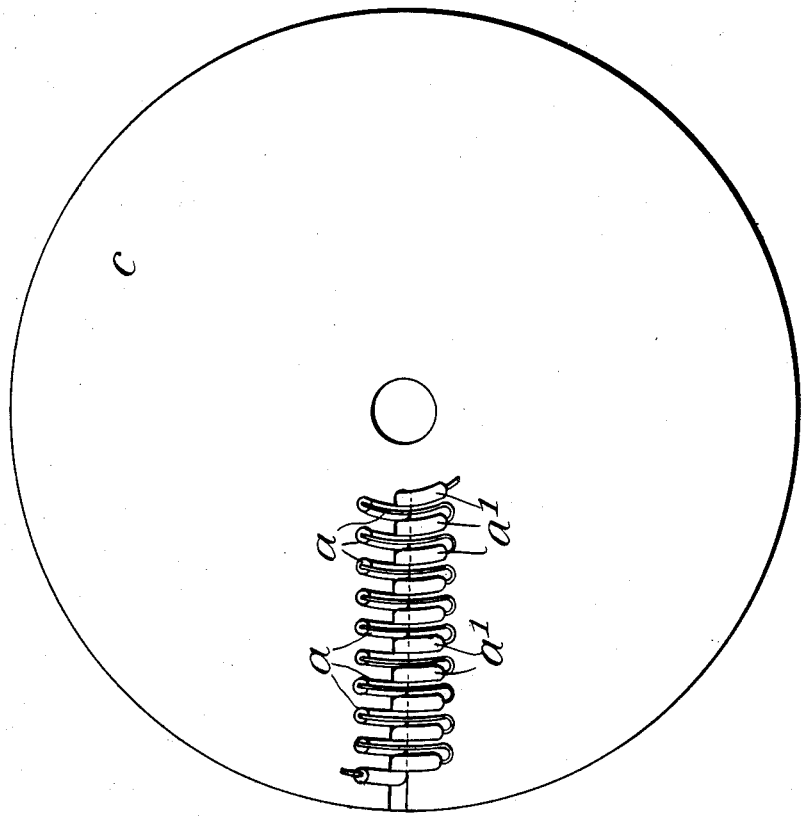

UNITED STATES PATENT OFFICE.

CHARLES E. HAY, OF ILFORD, AND HERBERT W. SULLIVAN, OF LONDON, ENGLAND.

ELECTRICAL RESISTANCE.

1,155,058.  Specification of Letters Patent.  Patented Sept. 28, 1915.

Application filed September 1, 1914. Serial No. 859,605.

*To all whom it may concern:*

Be it known that we, CHARLES EDWARD HAY and HERBERT WATSON SULLIVAN, subjects of the King of Great Britain, residing, respectively, at Ilford, in the county of Essex, and at London, both in England, have invented certain new and useful Improvements in Electrical Resistances, of which the following is a specification.

This invention relates to electrical resistances of high values for alternating currents particularly for wireless telegraphy and telephony.

The object of the present invention is to construct an improved compact resistance which is non-reactive, that is, free from residual inductance or capacity effects, and which may be readily adjusted to the high degree of ohmic accuracy necessary in precision instruments.

According to the present invention we employ a bifilar winding which is wound spirally to form a layer upon a cylindrical tube of insulating material having suitable dimensions. A number of cylindrical tubes are thus wound and are placed within each other and the lose ends of these bifilar wires are joined in series. Each layer is separated and insulated from its fellow layers by such a distance that the effective capacity between the layers is negligible compared with the capacity between the wires of each layer. The distance between the wires forming each bifilar convolution depends upon the gage of the wire and also the dimensions of the bobbin on which the wire is wound. These dimensions, in turn, are designed so as to obtain a minimum capacity to external conductors or bodies. The ends of each layer are looped or joined together at one side of the bobbin, and the other ends are brought out at the opposite side of the bobbin for adjustment and connection purposes. We so regulate the number of turns in each layer as to render each complete unit of resistance non-reactive. For example, in a 1,000 ohm coil of our design wound upon a bobbin, the first layer will be of a certain length and have a certain pre-calculated positive reactance (by the term "positive" we mean the preponderance of self-inductance over capacity). The second layer, being longer than the first, will have a correspondingly smaller positive reactance, and so on until with successive layers the zero reactance point has been reached. Then the next layer will have a negative reactance (the capacity preponderating over the self-inductance) and each successive layer will be increasingly negative by reason of its greater length. Therefore, when the various bifilar layers composing the coil are joined in series, the sum of the reactances, positive and negative respectively, are made to equal zero.

This method of construction has the advantage that for any given unit of resistance so formed, the coils have the smallest possible capacity to external bodies or conductors, and enables a resistance of higher ohmic value to be produced in a more compact form than has hitherto been designed for alternating current measurements of precision.

The invention is illustrated in the accompanying drawings; in which:—

Figure 1 is an end elevation of a resistance unit, and Fig. 2 is a side elevation partly in section.

These views are drawn to an enlarged scale and are somewhat diagrammatic.

$a$, $a'$, is a bifilar wire wound upon a cylindrical tube $b$. A number of tubes $b$ thus wound are placed within one another as shown in Fig. 2 and the loose ends of the wires $a$, $a'$, are brought out through a slot $c'$ in one of the cheeks $c$, and are then adjusted and are afterward connected in series in Fig. 1. In Fig. 2 we have only shown the ends of the innermost layer brought out for adjustment.

A 1,000 ohm coil may be constructed with the following dimensions: Gage of wire— 6 mils., specially covered to 10 mils. Material of wire—Ewèka. Length of bobbin— 550 mils. Diameter of bobbin—1250 mils. Number of layers of wire—10. Distance between layers—50 mils. In this example the wire is covered with silk and the tubes are made of vulcanized fiber.

What we claim is:—

1. An electrical resistance, having a plurality of superposed cylindrical windings connected in series and insulated from each other, the positive reactance in each winding from the innermost decreasing until the zero reactance point is reached, and additional windings each having a successively increasing negative reactance.

2. An electrical resistance, having a plurality of superposed cylindrical windings connected in series and insulated from each other, the positive reactance in each winding from the innermost decreasing until the zero reactance point is reached, additional windings each having a successively increasing negative reactance, so that the sum of the reactance positive and negative equals zero.

3. In an electrical resistance, the combination of a number of concentric cylindrical tubes made of insulating material, a bifilar wire, the wires of which are joined at one end, wound upon each tube and forming a layer thereon, the other and loose ends of said wires being brought out for adjustment and connected in series, the innermost layer of the windings having a pre-calculated positive reactance and each successive layer having a less positive reactance until the zero reactance point is reached, after which the layers have a negative reactance, each successive layer having a more negative reactance, so that the sum of the reactance positive and negative equals zero, substantially as shown and described.

4. In an electrical resistance, the combination of a number of concentric cylindrical tubes made of insulating material, a bifilar wire, the wires of which are joined at one end, wound upon each tube and forming a layer thereon, end cheeks, a slot in one end cheek through which the other and loose ends of said wires are brought out for adjustment and connected in series, the innermost layer of the windings having a pre-calculated positive reactance and each successive layer having a less positive reactance until the zero reactance point is reached, after which the layers have a negative reactance, each successive layer having a more negative reactance, so that the sum of the reactances positive and negative equals zero, substantially as shown and described.

In witness whereof we have hereunto set our hands in presence of two witnesses.

CHARLES E. HAY.
HERBERT W. SULLIVAN.

Witnesses:
O. J. NORTH,
WM. GIRLING.